(12) United States Patent
Miller

(10) Patent No.: US 7,823,198 B2
(45) Date of Patent: Oct. 26, 2010

(54) SECURE MEMORY STORAGE DEVICE

(75) Inventor: Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/531,408

(22) Filed: Sep. 13, 2006

(65) Prior Publication Data

US 2008/0066174 A1    Mar. 13, 2008

(51) Int. Cl.
*G06F 7/04* (2006.01)
(52) U.S. Cl. .................. 726/19; 713/193; 713/182; 713/185; 711/164; 711/145; 726/20
(58) Field of Classification Search ............... 726/19; 713/193
See application file for complete search history.

(56) References Cited

U.S. PATENT DOCUMENTS

| | | | |
|---|---|---|---|
| 7,058,391 B2* | 6/2006 | Tani | 455/411 |
| 7,159,120 B2* | 1/2007 | Muratov et al. | 713/182 |
| 2004/0083378 A1* | 4/2004 | LeRose | 713/193 |
| 2006/0036872 A1* | 2/2006 | Yen | 713/183 |

\* cited by examiner

*Primary Examiner*—Nasser Moazzami
*Assistant Examiner*—Fikremariam Yalew
(74) *Attorney, Agent, or Firm*—Cantor Colburn LLP; Robert Straight

(57) ABSTRACT

An electronic memory device configured to store and transfer data with a host device via a memory device connector and a mating host connector is disclosed. The electronic memory device includes a memory storage, a plurality of key buttons disposed upon the memory device, and a display disposed upon the memory device. The plurality of key buttons is configured to allow entry of a security code comprising a plurality of fields, and the display configured to display the security code. The memory device is configured to allow data transfer to or from the memory storage in response to entry of the security code, but to prevent data transfer to or from the memory storage prior to entry of the security code and in response to disconnection of the memory device from the host device.

10 Claims, 1 Drawing Sheet

SECURE MEMORY STORAGE DEVICE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to memory storage devices, and particularly to memory storage device data security.

2. Description of the Background

The use of small, portable memory devices such as USB keys, flash drives, compact flash memory, memoryStiks, and other such devices has flourished. The small size of these devices allows them to be integrated with many common everyday items, such as key chains, and pens, for example. They may be used with cameras, personal digital assistants (PDAs), phones, digital media players, as well as portable memory devices.

Many of these types of memory devices lack any capability to secure the data stored on the device. Some solutions that have been applied to this problem include the use of biometric protection such as fingerprints, and external security devices, such as locking devices to fit over a USB plug to prevent connection to a USB port. Another solution is a "password-type design" that uses software to protect confidential data and allows users to connect a USB flash drive to a computer system and the system will request users to enter a correct password for accessing files and data after detecting the USB flash drive. However, the confidential data stored in the memory devices made according to this design may be stolen by hacker programs or otherwise vulnerable to brute-force methods of attack. Further, many designs of present industrial computers do not have a keyboard, and thus the "password-type design" cannot be used for the transfer of data with these industrial computers. Incorporation of single-purpose number keys to enter a numeric password may provide protection, but such protection is limited to combinations defined, and limited by, the numeric keys. Although each of these methods may have certain utility, they may compromise device compatibility, physical size limitations, performance, cost factors, and ease-of-use. Accordingly, there is a need in the art for a secure memory storage device that overcomes these drawbacks.

SUMMARY OF THE INVENTION

The shortcomings of the prior art are overcome and additional advantages are provided through the provision of a memory storage device including integrated password entry and confirmation.

An embodiment of the invention provides an electronic memory device configured to store and transfer data with a host device via a memory device connector and a mating host connector. The electronic memory device includes a memory storage configured for signal communication with the memory device connector, a plurality of key buttons, and a display disposed upon the memory device, the display configured to display the security code. The key buttons are disposed upon the memory device and are configured to provide selection and entry of each field of a security code comprising a plurality of fields. The memory device is configured to allow data transfer to or from the memory storage in response to entry of the security code, but to prevent data transfer to or from the memory storage prior to entry of the security code and in response to disconnection of the memory device from the host device.

A further embodiment of the invention provides an electronic memory device configured to store and transfer data with a host device via a memory device connector and a mating host connector. The electronic memory device includes a memory storage configured for signal communication with the memory device connector, a plurality of key buttons, a display disposed upon the memory device, the display configured to display the security code, a plurality of dial locks configured to select a numerical access code, and an interference member slidably operable to allow and prevent connection between the memory device connector and the mating host connector. The key buttons are disposed upon the memory device and are configured to provide selection and entry of each field of a security code comprising a plurality of fields. The memory device is configured to allow data transfer to or from the memory storage in response to entry of the security code, but to prevent data transfer to or from the memory storage prior to entry of the security code and in response to disconnection of the memory device from the host device. In response to a non-entry of the access code, the plurality of dial locks are configured to restrain motion of the interference member, and in response to entry of the numerical access code, the plurality of mechanical dial locks are configured to allow the interference member to slidably retract and allow connection of the memory device connector with the mating host connector.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In an embodiment, a secure memory device will be disabled, or unable to allow data transfer, until the appropriate combination is entered into the integrated device lock. In an embodiment, the lock is implemented using electronic components, including digital displays and pushbuttons. In another embodiment, the lock is a mechanical lock utilizing small dials, sliders, or other mechanical controls to engage a physical means to prevent the attachment of the memory device to any host device. An embodiment of the invention will provide a greater number of elements in the security code. In an embodiment the circuitry is powered by a small long-life battery such as a lithium battery, for example. In another embodiment, the circuitry is powered by a small rechargeable battery. In an embodiment, the memory device is configured to recharge the rechargeable battery upon connection of the memory device to a host device. In an embodiment, the device can combine the mechanical lock to prevent attachment, and the electronic means to prevent access, and therefore, provide an enhanced level of security in protecting the data from others.

Figure 1:
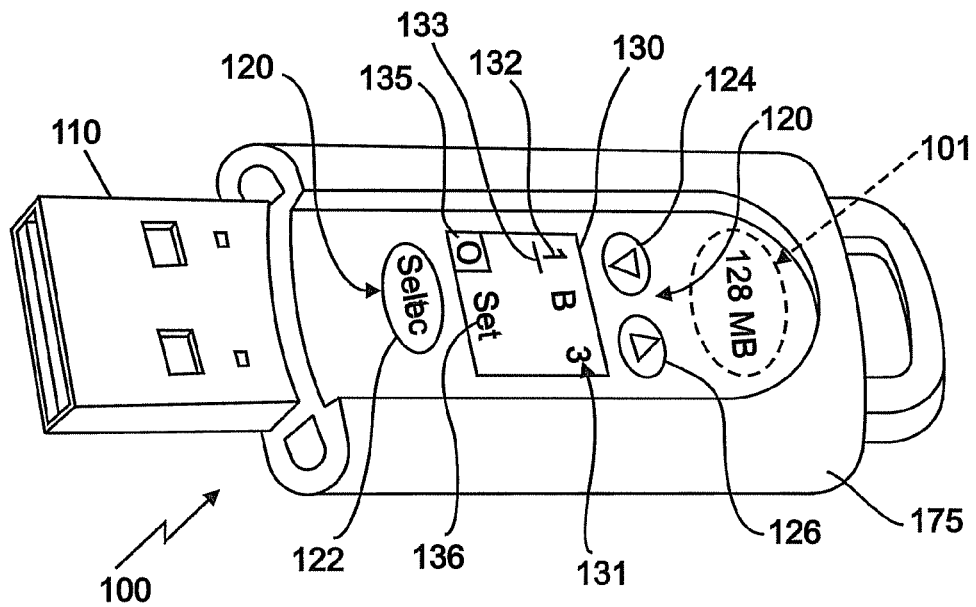
FIG. 1 illustrates one example of a secure electronic memory device in accordance with an embodiment of the invention.

Turning now to the drawings in greater detail, it will be seen that FIG. 1 depicts an exemplary embodiment of a secure electronic memory device 100. The secure electronic memory device 100 comprises a memory storage within the device represented by reference numeral 101, a memory device connector 110, a plurality of key buttons 120, and a display 130.

The memory device connector 110 is configured to connect the memory device 100 with a mating host connector (not shown) to allow the transfer of data between a host device such as a computer, a personal digital assistant (PDA), and a digital camera, for example, to the memory device 100. In an embodiment, the memory device connector 110 is a USB connector.

While an embodiment of the invention has been described having a USB memory device connector, it will be appreciated that the scope of the invention is not so limited, and that the invention will also apply to other memory device connectors, such as the appropriate connectors for memory devices having various known formats, such as CompactFlash™, Memory Stick™, MultiMedia™, SmartMedia™, SD™, and any appropriate connectors for future formats, for example.

In an embodiment, the memory device 100 is configured to prevent data transfer prior to entry of a security code, and is likewise configured to allow data transfer to or from the memory storage 101 in response to entry of the security code. Data transfer can be prevented by various means, which include but are not limited to, methods of disabling electronic components or disrupting control or data signal paths within said device. In order to maintain the security of the data contained in the memory device 100 following the entry of the security code, the memory device 100 is configured to reset, or to prevent any further data transfer to or from the memory storage 101, in response to disconnection of the memory device 100 from the host device. In an embodiment, prior to entry of the security code, the data stored within the memory device 100 is encrypted, and, in response to entry of the security code, the memory device 100 is configured to decrypt the data stored within the memory device 100, thereby allowing for the transfer of the data. Further, in order to maintain the security of the data contained in the memory device 100 following the entry of the security code, the memory device 100 is configured to reset, or to cease any further decryption of the data, in response to disconnection of the memory device 100 from the host device.

The plurality of key buttons 120 are disposed upon the memory device 100, and are configured to allow entry of the security code, as will be described further below. The display 130 is also disposed upon the memory device 100, and is configured to display to the user the progress of input of the attempted security code. In an embodiment, the display 130 is configured to display a status of entry of the security code. The display 130 allows the user to see a plurality of fields 131 of the security code. It will be appreciated that the embodiment in FIG. 1 depicts the security code including three fields that illustrate a code of 1, B, and 3. In an embodiment, the display 130 includes a status indicator 135, configured to indicate to the user that the correct security code has been entered.

The plurality of key buttons 120 are configured to provide selection and entry of each field 131 of the security code. In an embodiment, a field select button 122 is configured to designate a field of the plurality of fields 131 as a current field 132. The current field 132 is indicated by the inclusion of a current field indicator 133, such as an underline, beneath the current field 132, as depicted in the exemplary embodiment in FIG. 1. It will be further appreciated that in the embodiment depicted in FIG. 1, the current field 132 is that which displays the numeral "1". In an embodiment, the field select button 122 will function to advance the position of the current field indicator 133 from its current location to an adjacent location. In the embodiment depicted, in response to a first activation of the field select button 122, the current field indicator 133 will advance from the field that displays the numeral "1" to the field that displays the character "B", in response to a second activation of the field select button 122, the current field indicator 133 will advance from the field that displays the character "B" to the field that displays the character "3", in response to a third activation of the field select button 122, the current field indicator 133 will advance from the field that displays the character "3" to the field that displays the word "Set", which will be described further below, and in response to a fourth activation of the field select button 122, the current field indicator 133 will cycle back from the field that displays the word "Set" to the field that displays the character "1".

While an embodiment of the invention has been depicted having a current field indicator displayed as the underline, it will be appreciated that the scope of the invention is not so limited, and that the invention will also apply to memory devices having other current field indicators, such as, a box around the field, causing the field to blink, changing the intensity of the field, and changing the color of the field, for example.

In an embodiment, a value change button 124 is configured change the value of the current field of the security code. In an embodiment, the value change button 124 is configured to increment, or increase the value of the current field of the security code. In another embodiment, a second value change button 126 is configured to decrement, or decrease the value of the current field of the security code. It will be appreciated that in response to the selection of the value change button 124, the value of the current field 132 will change from "1" to "2".

In an embodiment, the plurality of key buttons 120 are configured to allow assignment, by the user, of a new security code. In an embodiment, assignment of the new security code may be initiated by repeatedly pressing the field select button 122 until the current field indicator 133 indicates that the current field is a code assignment field 136, indicated by the display 130 in the embodiment depicted in FIG. 1 by the word "Set". Subsequent to the entry of the current security code, the field select button 122 is used to advance the current field indicator 133 to indicate the code assignment field 136 as the current field. In response to activation of one of the value change buttons 124, 126, the current field indicator will advance to a first field 132 of the plurality of fields 131. Subsequent to the advance of the current field indicator 133 to the first field 132, a new security code will be assigned via the value change buttons 124, 126 and the field selection button 122 in a similar fashion as described above. Following user entry of the new security code, it may be stored by advancing the current field indicator 133 to the code assignment field 136 and subsequently activating one of the value change buttons 124, 126.

In an embodiment, the plurality of key buttons 120 are configured to enter the security code comprising a plurality of alphanumeric characters, and the display 130 is configured to display the plurality of alphanumeric characters. As used herein, the term "alphanumeric characters" shall refer to a character that is any of the twenty-six letters of the English alphabet, as well as any one of the ten Arabic numerals. It will be appreciated that use of alphanumeric characters, as contrasted with the exclusive use of numerals, provides an increased selection of choices for each field 131 of the security code, and will accordingly greatly increase the potential number of security codes that are available for a given number of fields 131 within the security code. It will be further appreciated that use of the field select key button 122 in conjunction with the value change key buttons 124, 126 to utilize alphanumeric characters will allow for selection of a greater number of combinations than are available via use of key buttons that each have a fixed numeric assignment.

While an embodiment of the invention has been depicted having a security code with three field positions, it will be appreciated that the scope of the invention is not so limited, and that the invention will also apply to memory devices that may have alternate numbers of field positions, such as two, four, five, or more, for example. Further, while an embodiment of the invention has been described having a security code including alphanumeric characters that correspond to the English alphabet and the Arabic numerals, it will be appreciated that the scope of the invention is not so limited, and that the invention will also apply to embodiments that may have security codes that employ characters from alternate languages, such as the Cyrillic, and Chinese alphabets, as well as punctuation and other alternate characters, for example.

Figure 2:
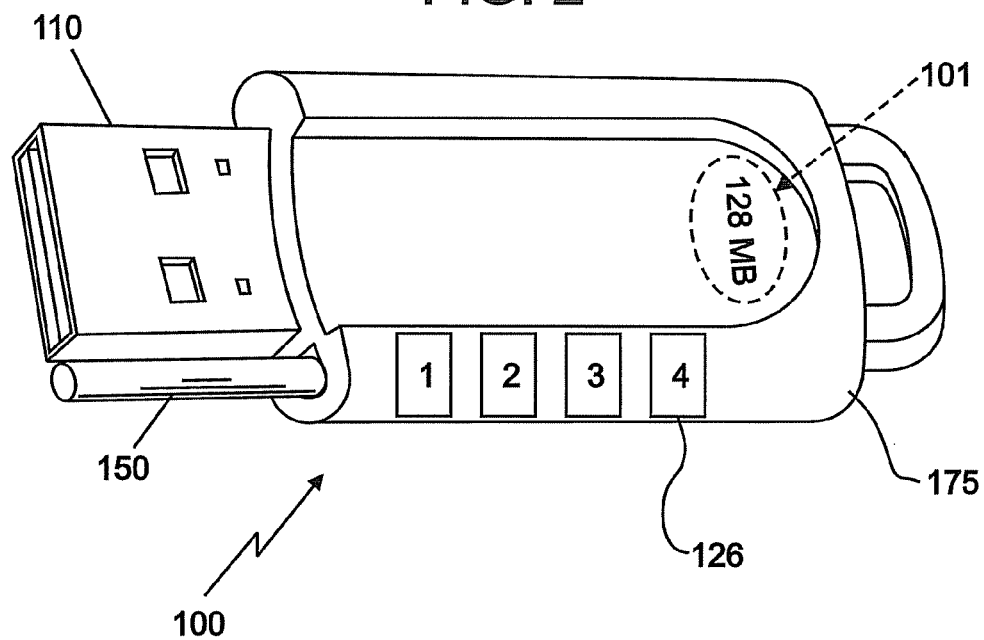
FIG. 2 illustrates another example of a secure electronic memory device in accordance with an embodiment of the invention.

Referring now to FIG. 2, in an embodiment the memory device 100 includes a plurality of dial locks 126 configured to allow entry of a numeric, alphanumeric, or other applicable access code. In an embodiment, the memory device also includes an interference member 150 slidably operable to allow and prevent physical connection between the memory device connector 110 and the mating host connector. In an embodiment, a compression spring, disposed within a housing 175 of the memory device 100 is disposed and configured to cause the interference member 150 to be biased to be disposed adjacent the memory device connector 110, as depicted in FIG. 2. In an embodiment, in response to a non-entry of the access code, the plurality of dial locks 126 are configured to restrain motion of the interference member 150, and thereby prevent the memory device connector 110 from connecting with the mating host connector. In an embodiment, in response to entry of the numerical, alphanumeric, or other applicable access code via the plurality of dial locks 126, the plurality of dial locks 126 are configured to allow the interference member 150 to slidably retract, and thereby allow physical connection of the memory device connector 110 with the mating host connector of the host device. In an embodiment, the interference member 150 is disposed proximate the memory device connector 110. In an embodiment, the interference member 150 and the plurality of dial locks 126 are utilized in combination with the plurality of key buttons 120 and the display 130, as described above, to provide enhanced security of the data within the memory device 100.

While an embodiment has been described having a compression spring to provide bias to the interference member, it will be appreciated that the scope of the invention is not so limited, and that the invention will also apply to memory devices having alternate means to cause translation of the interference member, such as an extension spring, a user-activated slide, a screw drive, and a solenoid, for example. Further, while an embodiment of the invention has been described having an interference member disposed proximate the memory device connector, it will be appreciated that the scope of the invention is not so limited, and that the invention will also apply to memory devices having additional configurations of interference members to prevent connection of the memory device connector to the mating host connector, such as interference members surrounding the memory device connector, and interference members disposed within the memory device connector, for example. While an embodiment of the invention has been described having dial locks to allow entry of the access code, it will be appreciated that the scope of the invention is not so limited, and that the invention will also apply to memory storage devices that have alternate means to enter the access code, such as slider locks, push buttons, and key buttons configured to operate in conjunction with the display, for example.

The capabilities of the present invention can be implemented in software, firmware, hardware or some combination thereof.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An electronic memory device configured to store and transfer data with a host device via a memory device connector and a mating host connector, the electronic memory device comprising:
   a memory storage configured for signal communication with the memory device connector;
   a plurality of key buttons disposed upon the memory device, the plurality of key buttons configured to allow entry of a security code comprising a plurality of fields; and
   a display disposed upon the memory device, the display configured to display the security code;
   wherein the plurality of key buttons are configured to provide selection and entry of each field of the security code;
   wherein the memory device is configured to prevent data transfer to or from the memory storage prior to entry of the security code;
   wherein the memory device is configured to allow data transfer to or from the memory storage in response to entry of the security code; and
   wherein the memory device is configured to prevent data transfer to or from the memory storage in response to disconnection of the memory device from the host device;
   a plurality of dial locks configured to allow entry of an access code;
   an interference member slidably operable to allow and prevent physical connection between the memory device connector and the mating host connector;
   wherein in response to a non-entry of the access code the plurality of dial locks are configured to restrain motion of the interference member; and
   wherein in response to entry of the access code, the plurality of dial locks are configured to allow the interference member to slidably retract and allow connection of the memory device connector with the mating host connector.

2. The memory device of claim 1, wherein:
the display is configured to display a status of entry of the security code.

3. The memory device of claim 1, wherein:
the plurality of key buttons are configured to enter the security code comprising a plurality of alphanumeric characters, and
the display is configured to display the plurality of alphanumeric characters.

4. The memory device of claim 1, wherein:
prior to entry of the security code, the data stored within the memory device is encrypted;
in response to entry of the security code, the memory device is configured to decrypt the data; and
in response to disconnection of the memory device from the host device, the memory device is configured to cease decryption of the data.

5. The memory device of claim 1, wherein:
the memory device connector is a USB connector.

6. The memory device of claim 1, wherein the plurality of key buttons comprise:
a field select button configured to designate a field of the plurality of fields as a current field; and
a value change button configured to change the value of the current field of the security code.

7. The memory device of claim 1, wherein:
the plurality of key buttons are configured to allow assignment of a new security code.

8. The memory device of claim 7, wherein:
the access code comprises a numerical access code.

9. The memory device of claim 1, wherein:
the interference member is disposed proximate the memory device connector.

10. An electronic memory device configured to store and transfer data with a host device via a memory device connector and a mating host connector, the electronic memory device comprising:

a memory storage configured for signal communication with the memory device connector;

a plurality of key buttons disposed upon the memory device, the plurality of key buttons configured to allow entry of a security code comprising a plurality of alphanumeric fields;

a display disposed upon the memory device, the display configured to display the alphanumeric fields of the security code and a status of entry of the security code;

a plurality of dial locks configured to allow entry of a numerical access code; and an interference member slidably operable to allow and prevent connection between the memory device connector and the mating host connector wherein the plurality of key buttons are configured to provide selection and entry of each field of the security code;

wherein the memory device is configured to prevent data transfer to or from the memory storage prior to entry of the security code;

wherein the memory device is configured to allow data transfer to or from the memory storage subsequent to entry of the security code;

wherein the memory device is configured to prevent data transfer to or from the memory storage in response to disconnection of the memory device from the host device;

wherein in response to a non-entry of the access code the plurality of dial locks are configured to restrain motion of the interference member; and wherein in response to entry of the numerical access code, the plurality of mechanical dial locks are configured to allow the interference member to slidably retract and allow physical connection of the memory device connector with the mating host connector.

* * * * *